US012784235B2

(12) United States Patent
Wingert

(10) Patent No.: US 12,784,235 B2
(45) Date of Patent: Nov. 3, 2026

(54) OBJECT TRACKING ON THE BASIS OF A MOVEMENT MODEL

(71) Applicant: VALEO SCHALTER UND SENSOREN GMBH, Bietigheim-Bissingen (DE)

(72) Inventor: Daniel Wingert, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 339 days.

(21) Appl. No.: 18/575,695

(22) PCT Filed: Jun. 22, 2022

(86) PCT No.: PCT/EP2022/066939
§ 371 (c)(1),
(2) Date: Aug. 16, 2024

(87) PCT Pub. No.: WO2023/274795
PCT Pub. Date: Jan. 5, 2023

(65) Prior Publication Data

US 2024/0412381 A1 Dec. 12, 2024

(30) Foreign Application Priority Data

Jun. 29, 2021 (DE) ..................... 10 2021 116 693.4

(51) Int. Cl.
*G06T 7/246* (2017.01)
*B60W 60/00* (2020.01)
(Continued)

(52) U.S. Cl.
CPC ........... *G06T 7/246* (2017.01); *B60W 60/001* (2020.02); *G06T 7/277* (2017.01); *G06T 7/73* (2017.01);
(Continued)

(58) Field of Classification Search
CPC ........... G06T 7/20; G06T 7/246; G06T 7/251; G06T 7/277; G06T 7/70; G06T 7/73;
(Continued)

(56) References Cited

U.S. PATENT DOCUMENTS 10,816,344 B2 * 10/2020 Schiffmann ............ G01C 21/26
12,110,042 B1 * 10/2024 Hoang .............. B60W 50/0097
(Continued)

FOREIGN PATENT DOCUMENTS

DE 102013018310 A1 4/2015
EP 3537173 A1 9/2019

OTHER PUBLICATIONS

International Search Report and Written Opinion in corresponding International Application No. PCT/EP2022/066939, dated Oct. 7, 2022 (21 pages).
(Continued)

*Primary Examiner* — Brandon Z Willis
(74) *Attorney, Agent, or Firm* — Osha Bergman Watanabe & Burton LLP

(57) ABSTRACT

According to an object tracking method, a first state of an object is estimated by at least one computing unit based on a predefined movement model for the object to be tracked, where the first state includes a first direction of movement of a point to be tracked. An environmental sensor system generates environmental sensor data representing the object to be tracked and a geometric orientation of the object to be tracked is determined on the basis thereof by the computing unit. The point to be tracked is shifted by the computing unit depending on a first deviation of the geometric orientation from the first direction of movement, and a second state of the object to be tracked is determined by the computing unit depending on the first state and the shifted point.

15 Claims, 2 Drawing Sheets

Figure 1:
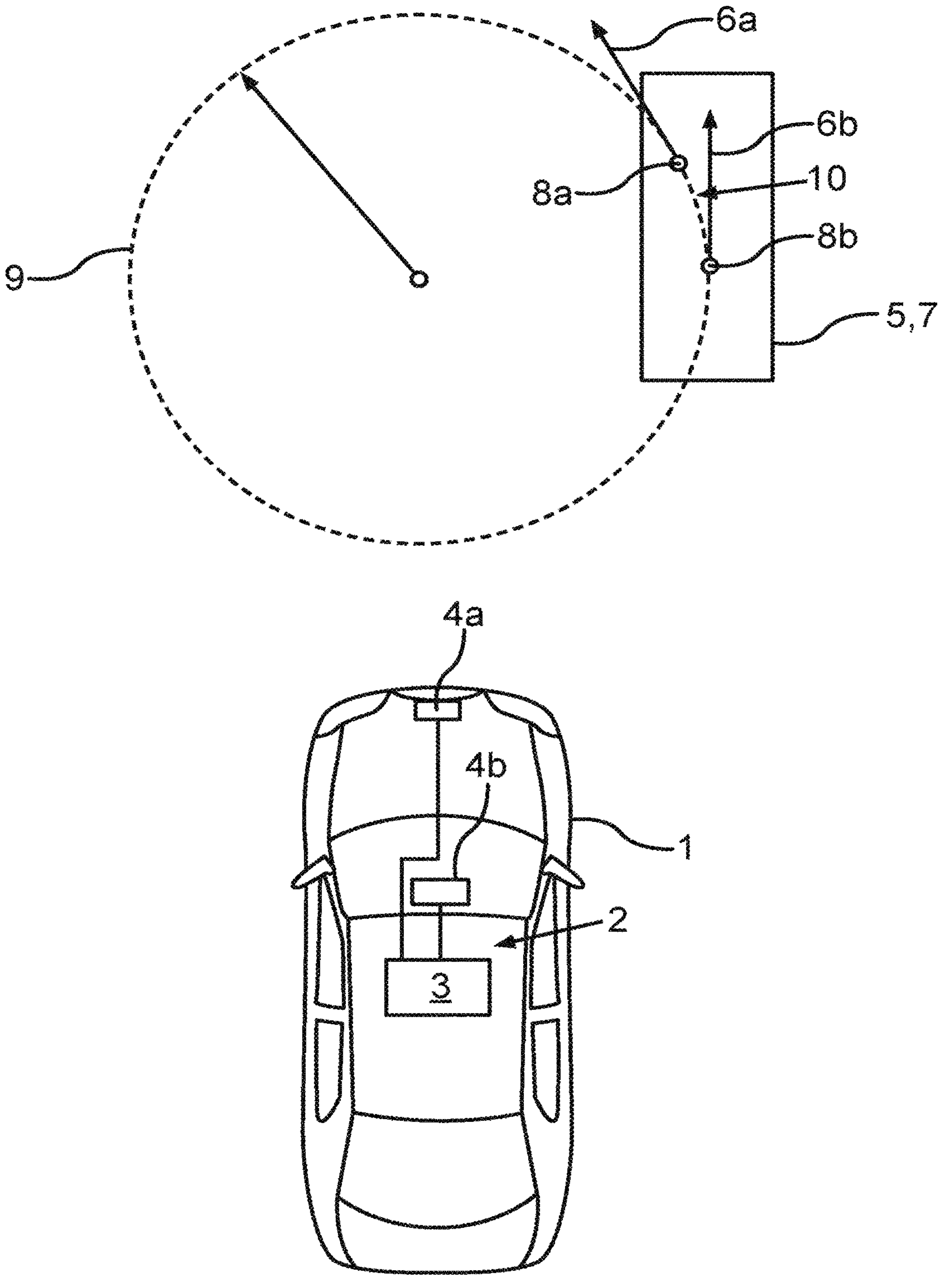

(51) Int. Cl.
*G06T 7/277* (2017.01)
*G06T 7/73* (2017.01)

(52) U.S. Cl.
CPC . *B60W 2420/403* (2013.01); *B60W 2420/408* (2024.01); *B60W 2554/4044* (2020.02); *G06T 2207/10028* (2013.01); *G06T 2207/30252* (2013.01)

(58) Field of Classification Search
CPC ............. G06T 7/75; G06T 2207/10028; G06T 2207/10016; G06T 2207/30248; G06T 2207/30252; G06T 2207/30261; G06V 10/62; G06V 20/58; B60W 60/001; B60W 2420/403; B60W 2420/408; B60W 2554/4044; B60W 2554/4042; B60W 2554/4043
See application file for complete search history.

(56) References Cited

U.S. PATENT DOCUMENTS

| | | | | |
|---|---|---|---|---|
| 2018/0322650 | A1* | 11/2018 | Becker | G06V 20/58 |
| 2019/0317219 | A1* | 10/2019 | Smith | G01S 17/931 |
| 2022/0120858 | A1* | 4/2022 | Cennamo | G01S 7/417 |
| 2023/0094836 | A1* | 3/2023 | Kellner | G01S 13/426 342/52 |

OTHER PUBLICATIONS

German Search Report in corresponding German Application No. 10 2021 116 693.4, dated Jan. 20, 2022 (9 pages).

Kellner Dominik et al. “Tracking of Extended Objects with High-Resolution Doppler Radar”, IEEE Transactions on Intelligent Transportation Systems, IEEE, Piscataway, NJ, USA, vol. 17, No. 5, May 1, 2016 (May 1, 2016), pp. 1341-1353, DOI: 10.1109/TITS.2015.2501759, ISSN: 1524-9050, XP011608058 (13 pages).

Tsogas M et al. “Unscented Kalman Filter Design for Curvilinear Motion Models Suitable for Automotive Safety Applications”, Information Fusion, 2005 7th International Conference on Philadelphia, PA, USA Jul. 25-28, 2005, Piscataway, NJ, USA, IEEE, vol. 2, Jul. 25, 2005 (Jul. 25, 2005), pp. 1295-1302, DOI: 10.1109/ICIF/2005.1592006, ISBN: 978-0-7803-9286-1, XP010892372 (8 pages).

Barth, A., Pfeiffer, D. Franke, U. “Vehicle tracking at urban intersections using dense stereo” In: 3rd Workshop on Behaviour Monitoring and Interpretation, BMI. 2009. S. 1-12 (URL: http://citeseerx.ist. psu.edu/viewdoc/download?doi=10.1.1.375.9172&rep=rep1&type=pdf) (12 pages).

Barth, A. Franke, U. “Where will the oncoming vehicle be the next second?” In: 2008 IEEE Intelligent Vehicles Symposium. IEEE, 2008. S. 1068-1073. doi: 10.1109/IVS.2008.4621210 (6 pages).

Barth, A., Franke, U. “Estimating the driving state of oncoming vehicles from a moving platform using stereo vision” IEEE Transactions on Intelligent Transportation Systems, 2009, 10. Jg., Nr. 4, S. 560-571. doi: 10.1109/TITS.2009.2029643 (12 pages).

Hermes, C. et al. “Object motion analysis and prediction in stereo image sequences” 8. In: Oldenburger 3D-Tage, 2009, S. 1-10. (URL: http://citeseerx.ist.psu.edu/viewdoc/download?doi=10.1.1.158.2627&rep=rep1&type=pdf) (10 pages).

R. Schubert et al. “Comparison and evaluation of advanced motion models for vehicle tracking” 2008, 11th International Conference on Information Fusion, 2008, pp. 1-6 (6 pages).

* cited by examiner

OBJECT TRACKING ON THE BASIS OF A MOVEMENT MODEL

The present invention relates to an object tracking method, wherein at least one computing unit is used to estimate a first state of an object to be tracked on the basis of a predefined movement model for the object to be tracked, wherein the first state comprises a first direction of movement of a point to be tracked, the position of which with respect to the object to be tracked is predefined, and an environmental sensor system is used to generate environmental sensor data which represent the object to be tracked. The invention also relates to a method for at least partially automatically guiding an ego vehicle, to an electric vehicle guidance system, and to a computer program product.

In the automatic or partially automatic guidance of an ego vehicle, i.e. in the context of driver assistance systems or autonomous or partially autonomous driving functions for example, object tracking is, from the point of view of the ego vehicle, wherein the object is, for example, other road users or other vehicles in the environment of the ego vehicle, a central task in order to be able to ensure a safe and reliable automatic or partially automatic drive or driver assistance. For example, in order to estimate future states of the object to be tracked, use is made of iterative methods that presuppose known movement models that approximately describe the dynamic behavior of the object to be tracked. A possible and widely used movement model is the so-called single-track model.

The publication R. Schubert et al.: "Comparison and evaluation of advanced movement models for vehicle tracking", 2008, 11th International Conference on Information Fusion, 2008, pp. 1-6, presents and compares various other movement models suitable for object tracking in the automotive context.

For state prediction and verification or refinement, Kalman filter methods or derivatives thereof, for example an extended Kalman filter method, an unscented Kalman filter method and so on, are used, for example.

It is an object of the present invention to increase the accuracy of object tracking on the basis of a movement model, in particular the tracking of external vehicles from the point of view of an ego vehicle on the basis of a movement model.

This object is achieved by the respective subject matter of the independent claims. The dependent claims relate to advantageous developments and preferred embodiments.

The invention is based on the idea of shifting a point of the object to be tracked, which is tracked on the basis of the movement model or whose state is estimated on the basis of the movement model, such that the resulting direction of movement of the shifted point better corresponds to a geometric orientation of the object to be tracked, as based on environmental sensor data.

According to one aspect of the invention, an object tracking method is specified. In this case, at least one computing unit, in particular of an ego vehicle, is used to estimate a first state of an object to be tracked, which is located in particular in an environment of the ego vehicle, on the basis of a predefined movement model for the object to be tracked. The first state comprises a first direction of movement of a point to be tracked. An environmental sensor system, in particular of the ego vehicle, is used to generate environmental sensor data which represent the object to be tracked. The at least one computing unit is used to determine a geometric orientation of the object to be tracked on the basis of the environmental sensor data. The point to be tracked is shifted by means of the at least one computing unit depending on a first deviation of the geometric orientation from the first direction of movement. The at least one computing unit is used to determine a second state of the object to be tracked depending on the first state and the shifted point.

The point to be tracked has a predefined position relative to the object to be tracked. The point to be tracked can be on or in the object, but it can also be outside the object. It is therefore in particular a virtual point which is tracked on the basis of the movement model.

The state, in particular the first and the second state, of the object to be tracked comprises the corresponding direction of movement of the object to be tracked and, if necessary, other model parameters, for example a velocity, acceleration and/or position of the point to be tracked and so on. According to the movement model, the direction of movement of the state, i.e. in particular the first state, corresponds to the direction of movement of the point to be tracked. In the context of the method according to the invention, however, this point is converted into the shifted point, with the result that the second state comprises, for example, the direction of movement of the shifted point instead of the direction of movement of the point to be tracked.

The direction of movement of the object to be tracked is a particularly suitable model parameter. The direction of movement can be estimated on the one hand within the framework of the movement model and on the other hand directly or indirectly measured using the environmental sensor system of the ego vehicle, for example using cameras, lidar systems or radar systems. For this purpose, computer vision algorithms or other algorithms for automated perception can be used in particular to obtain corresponding measured values for the direction of movement based on the environmental sensor data.

In general, the movement of the point to be tracked is composed of the translational movement and a rotational movement. The first direction of movement can be understood as meaning in particular the direction of movement of the translational movement of the point to be tracked.

The first direction of movement and the geometric orientation can be given, for example, by corresponding angles in a known coordinate system. The first deviation therefore corresponds in particular to an angular difference or an absolute value of the corresponding angular difference.

For example, the geometric orientation of the object to be tracked can be given by a constant direction firmly predefined with respect to the object to be tracked. The geometric orientation of a vehicle can be given, for example, by its longitudinal axis or the direction of the longitudinal axis. For example, this can be at least approximately determined by the alignment or orientation of a bounding figure, also referred to as a bounding box, which can be determined by the at least one computing unit on the basis of the environmental sensor data. The bounding figure can correspond, for example, to a rectangle or a cuboid which includes the object to be tracked in the representation by the environmental sensor data, i.e. for example in a corresponding camera image or in a corresponding lidar or radar point cloud.

When looking at different points on the object to be tracked or with a predefined position with respect to the object to be tracked, the direction of movement of the points is generally different during a general movement of the object to be tracked. Accordingly, the direction of movement of the point to be tracked generally deviates from the geometric orientation, with the result that the first deviation is generally different from zero.

By taking the first deviation into account in order to determine the second state of the object to be tracked, it is therefore possible to more accurately and more reliably estimate further states of the object to be tracked. For example, for that purpose, the greater the first deviation, the greater the shift of the point to be tracked may be in order to obtain the shifted point.

The first state can be estimated, for example, using a Kalman filter algorithm or on the basis of another mathematical estimation algorithm, in particular an iterative estimation algorithm. Such methods usually include estimating a state of the object to be tracked, in particular on the basis of the movement model, and refining or improving the estimated state taking into account measured values, in particular the environmental sensor data. This means that the movement model can be taken as a basis in the first place, but corresponding actual measured values can also be captured in order to take into account deviations from the ideal or expected behavior. In the context of the invention, the first state can then correspond, for example, to the state estimated on the basis of the movement model, and the second state can correspond to the state improved or refined on the basis of the environmental sensor data. In such cases, the first and second states relate in particular to the same time period or the same iteration step.

According to the invention, the refinement step, that is to say the step for determining the second state of the object to be tracked, is now not carried out on the basis of the point to be tracked, the direction of movement of which was estimated as the first direction of movement and part of the first state, but rather on the basis of the shifted point. By taking into account the deviation of the first direction of movement from the geometric orientation, in particular a second deviation of the direction of movement of the shifted point from the geometric orientation can be smaller than the first deviation or ideally equal to zero. In this way, the refined estimated state better corresponds to the movement model. Overall, an error in the object tracking can thus be reduced, especially if the aforementioned method steps are iteratively repeated, and accordingly an accuracy and reliability of the object tracking can be increased. Ultimately, this increases the safety of a driver assistance function or a function for automatically or partially automatically driving the ego vehicle based on the output of the object tracking method.

The greater the first deviation of the first direction of movement from the geometric orientation of the object to be tracked, the greater the improvement in accuracy by virtue of the invention. Therefore, the larger the object is, the greater the improvement in accuracy may be, in particular.

Depending on the embodiment, the environmental sensor system may include one or more subsystems, for example, one or more cameras, one or more lidar sensor systems and/or one or more radar sensor systems. Accordingly, the environmental sensor data may include one or more camera images, one or more lidar point clouds and/or one or more radar point clouds.

According to at least one embodiment of the object tracking method according to the invention, a current radius of movement of the point to be tracked is determined, in particular by means of the at least one computing unit, on the basis of the first state. The point to be tracked is then shifted depending on the current radius of movement.

Both the point to be tracked and the shifted point are located on a circular arc corresponding to the current radius of movement. In particular, the at least one computing unit can determine a circle center of the circular arc and the current radius of movement on the basis of the first state.

The point to be tracked is shifted depending on the first deviation and the current radius of movement. In particular, the greater the first deviation and the greater the current radius of movement, the greater the shift. This makes it possible to at least partially compensate for the deviation of the geometric orientation from a second direction of movement of the shifted point with respect to the first deviation of the geometric orientation from the first direction of movement of the point to be tracked.

According to at least one embodiment, the first state contains a translational velocity of the object to be tracked, in particular of the point to be tracked, and an angular velocity of the point to be tracked. The current radius of movement is determined, in particular by means of the at least one computing unit, as the ratio of the translational velocity to the angular velocity, i.e. as the quotient of the translational velocity and the angular velocity.

The translational velocity is in particular parallel to the first direction of movement and the angular velocity corresponds to an angular velocity around the circle center corresponding to the current radius of movement. In this way, the current radius of movement can be reliably determined or estimated.

According to at least one embodiment, the point to be tracked is shifted along a circular arc having a radius equal to the current radius of movement. In other words, the point to be tracked and the shifted point are on a circular arc.

According to at least one embodiment, the first deviation is determined as a first angular difference between the geometric orientation and the first direction of movement. The shifting is carried out by a circular arc section of the circular arc, wherein the circular arc section has a length L that is given by $L=D*R$, where D denotes the first angular difference and R denotes the current radius of movement.

For small first angular differences, a very accurate shift can thus be effected in such a way that the first deviation is compensated for as far as possible, and the second deviation of the second direction of movement of the shifted point from the geometric orientation is thus approximately equal to zero. This achieves a particularly good correspondence to the movement model.

According to at least one embodiment, the second state contains the second direction of movement of the shifted point. The second deviation of the geometric orientation from the second direction of movement is smaller than the first deviation, in particular equal to zero or approximately equal to zero.

According to at least one embodiment, the second direction of movement is equal to the geometric orientation or approximately equal to the geometric orientation.

In other words, the second deviation in this case is at least approximately equal to zero. This makes it possible to achieve a good correspondence to the movement model.

According to at least one embodiment, a point cloud is generated on the basis of the environmental sensor data or the environmental sensor data include the point cloud. A part of the point cloud representing the object to be tracked is identified. A bounding figure which includes the part of the point cloud is determined, in particular by means of the at least one computing unit, the bounding figure having a predefined geometric shape. The geometric orientation of the object to be tracked corresponds to a spatial orientation of the bounding figure.

By specifying the geometric shape of the bounding figure, for example by corresponding symmetry or, in the case of a polygon, the number of sides, the geometric orientation can be clearly defined according to the spatial orientation of the bounding figure. In particular, the bounding figure is a rectangle or a cuboid. Depending on the embodiment, an aspect ratio of the rectangle or the cuboid can be specified or variable.

The point cloud corresponds in particular to a lidar point cloud or a radar point cloud. The point cloud contains a large number of points. The part of the point cloud representing the object to be tracked corresponds to a subset of the point cloud. The part of the point cloud representing the object to be tracked can be determined or identified, for example, by using a clustering method.

Such embodiments have the advantage that corresponding bounding figures can be determined using known methods, with the result that the first deviation can be precisely determined and compensated for. In particular, a reproducible and reliable result of the determination of the geometric orientation can be achieved by using a rectangular or cuboidal bounding figure.

According to at least one embodiment, a camera image is generated on the basis of the environmental sensor data or the environmental sensor data include the camera image. A bounding figure which includes the representation of the object to be tracked in the camera image is determined, the bounding figure having a predefined shape. The geometric orientation of the object to be tracked corresponds to a spatial orientation of the bounding figure.

The statements made above with respect to the bounding figure of the part of the point cloud apply analogously to the bounding figure. The bounding figure can be determined in such embodiments, for example, using an object recognition algorithm by means of the at least one computing unit. For example, this may be an algorithm based on machine learning, for example an algorithm based on a trained artificial neural network. Numerous architectures are known for this, for example according to the so-called YOLO algorithm.

According to at least one embodiment, a method based on a Kalman filter is used to determine the second state.

The method based on the Kalman filter may correspond, for example, to a Kalman filter method, an extended Kalman filter method, an unscented Kalman filter method or any other derivative of the Kalman filter method.

In an iteration step of the Kalman filter method, the first state is first estimated, which is also referred to as prediction. Then, for example, a Kalman gain factor or the like is determined and the prediction is improved on the basis of this, in particular depending on the corresponding measured values, here the environmental sensor data, in order to determine the second state, which can also be referred to as refinement. According to the invention, however, the refinement is not based on the original point to be tracked, but on the shifted point. In this way, established methods based on the Kalman filter or the like can be enabled to achieve more accurate object tracking.

According to a further aspect of the invention, a method for at least partially automatically guiding an ego vehicle, which is in particular a motor vehicle, is specified. An object tracking method according to the invention is carried out by means of the ego vehicle, in particular an electronic vehicle guidance system of the ego vehicle, which comprises the environmental sensor system and the at least one computing unit. A control unit of the ego vehicle, in particular of the electronic vehicle guidance system, for example the at least one computing unit, is used to generate, depending on the second state of the object to be tracked, at least one control signal for at least partially automatically guiding the ego vehicle.

For example, the at least one control signal is supplied to at least one corresponding actuator of the ego vehicle, which can then at least partially automatically guide the ego vehicle on the basis of the at least one control signal or can implement the at least partially automatic guidance. Alternatively or additionally, the at least one control signal can also be used for driver assistance for a driver of the ego vehicle.

According to a further aspect of the invention, an electronic vehicle guidance system for an ego vehicle is specified. The electronic vehicle guidance system has at least one computing unit which is configured to estimate a first state of an object to be tracked, in particular in the environment of the ego vehicle, on the basis of a predefined movement model for the object to be tracked, wherein the first state comprises a first direction of movement of a point to be tracked. The electronic vehicle guidance system has an environmental sensor system for the ego vehicle, which is configured to generate environmental sensor data representing the object to be tracked. The at least one computing unit is configured to determine a geometric orientation of the object to be tracked on the basis of the environmental sensor data, to shift the point to be tracked depending on a first deviation of the geometric orientation from the first direction of movement, and to determine a second state of the object to be tracked depending on the first state and the shifted point.

Further embodiments of the electronic vehicle guidance system follow directly from the various configurations of the object tracking method according to the invention and of the method according to the invention for at least partially automatically guiding an ego vehicle and vice versa in each case. In particular, an electronic vehicle guidance system according to the invention is configured to carry out a method according to the invention or carries out such a method.

According to a further aspect of the invention, a computer program containing instructions is specified. When the instructions are executed by an electronic vehicle guidance system according to the invention, in particular by the at least one computing unit of the electronic vehicle guidance system, the instructions cause the electronic vehicle guidance system to carry out an object tracking method according to the invention or a method according to the invention for at least partially automatically guiding an ego vehicle.

According to a further aspect of the invention, a computer-readable storage medium that stores a computer program according to the invention is specified.

The computer program according to the invention and the computer-readable storage medium according to the invention can be understood as respective computer program products containing the instructions.

An electronic vehicle guidance system may be understood as meaning an electronic system which is configured to guide or control the motor vehicle in a fully automatic or fully autonomous manner, in particular without the need for a driver to intervene in a control process. The motor vehicle or the electronic vehicle guidance system carries out all required functions, such as possibly required steering, braking, and/or acceleration maneuvers, observing and detecting the road traffic, and the required responses associated therewith, in a self-acting and fully automatic manner. In particular, the electronic vehicle guidance system may be used to implement a fully automatic or fully autonomous driving mode of the motor vehicle according to Level 5 of the classification according to SAE J3016. An electronic vehicle guidance system may also be understood as meaning an advanced driver assistance system (ADAS) which assists the driver during a partially automated or partially autonomous drive of the motor vehicle. In particular, the electronic vehicle guidance system may be used to implement a partially automated or partially autonomous driving mode of the motor vehicle according to one of Levels 1 to 4 according to the SAE J3016 classification. Here and hereinbelow, "SAE J3016" refers to the corresponding standard in the version of June 2018.

The at least partially automatic vehicle guidance may therefore involve guiding the motor vehicle according to a fully automatic or fully autonomous driving mode of Level 5 according to SAE J3016. The at least partially automatic vehicle guidance may also involve guiding the vehicle according to a partially automated or partially autonomous driving mode according to one of Levels 1 to 4 according to SAE J3016.

A computing unit can be understood as meaning, in particular, a data processing device; i.e., the computing unit can in particular process data for the purpose of performing computing operations. Optionally, these also include operations for performing indexed access to a data structure, for example a lookup table (LUT).

The computing unit can in particular contain one or more computers, one or more microcontrollers, and/or one or more integrated circuits, for example one or more application-specific integrated circuits (ASIC), one or more field-programmable gate arrays (FPGA), and/or one or more systems-on-a-chip (SoC). The computing unit can also contain one or more processors, for example one or more microprocessors, one or more central processing units (CPU), one or more graphics processing units (GPU), and/or one or more signal processors, in particular one or more digital signal processors (DSP). The computing unit may also contain a physical or virtual group of computers or other types of the mentioned units.

In various exemplary embodiments, the computing unit contains one or more hardware and/or software interfaces and/or one or more storage units.

A storage unit can be embodied as a volatile data memory, for example as a dynamic random access memory (DRAM) or a static random access memory (SRAM), or as a non-volatile data memory, for example as a read-only memory (ROM), as a programmable read-only memory (PROM), as an erasable read-only memory (EPROM), as an electrically erasable read-only memory (EEPROM), as a flash memory or flash EEPROM, as a ferroelectric random-access memory (FRAM), as a magnetoresistive random-access memory (MRAM), or as a phase-change random-access memory (PCRAM).

If reference is made within the scope of the present disclosure to a component of the electronic vehicle guidance system according to the invention, in particular the at least one computing unit or the control unit of the electronic vehicle guidance system, being configured, embodied, designed, or the like to carry out or implement a specific function, to achieve a specific effect or to serve a specific purpose, this can be understood as meaning that the component is specifically and actually able to carry out or implement the function, to achieve the effect or to serve the purpose, beyond the fundamental or theoretical usability or suitability of the component for this function, effect or purpose, by way of an appropriate adaptation, appropriate programming, an appropriate physical design and so on.

An object recognition algorithm can be understood as meaning a computer algorithm that is able to identify one or more objects within a provided input image by stipulating corresponding bounding figures or bounding boxes and assigning a corresponding object class to each of the bounding boxes, wherein the object classes can be selected from a predefined set of object classes. The assignment of an object class to a bounding box can be understood in such a way that a corresponding confidence value or a probability of the object identified within the bounding box belonging to the corresponding object class is provided. For example, the algorithm for a given bounding box can provide such a confidence value or probability for each of the object classes. For example, assigning the object class can include selecting or providing the object class with the highest confidence value or probability. Alternatively, the algorithm can also only specify the bounding boxes without assigning a corresponding object class.

Further features of the invention can be found in the claims, the figures, and the description of the figures. The features and combinations of features mentioned above in the description and the features and combinations of features mentioned below in the description of the figures and/or shown in the figures can be included in the invention not only in the combination specified in each case, but also in other combinations. In particular, embodiments and combinations of features that do not have all the features of an originally worded claim are also included in the invention. Furthermore, embodiments and combinations of features that go beyond or differ from the combinations of features set out in the back-references of the claims are included in the invention.

Figure 2:
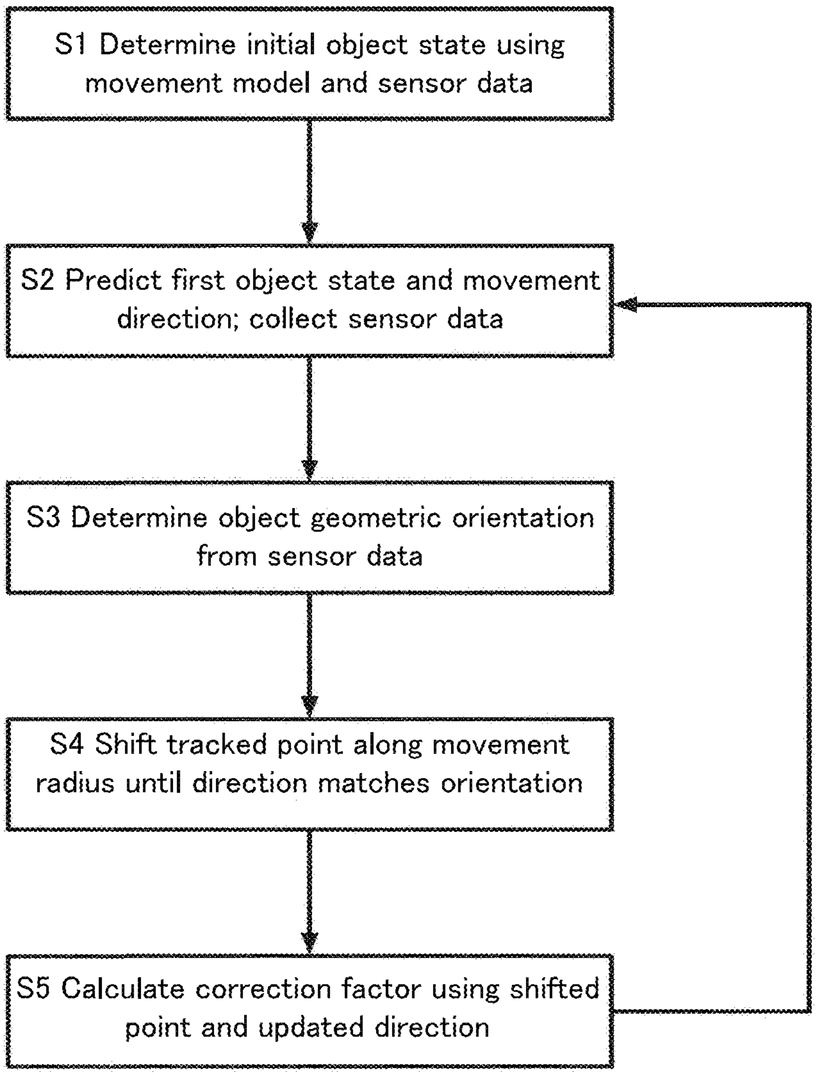

In the figures:

FIG. 1 shows a schematic illustration of an ego vehicle having an exemplary embodiment of an electronic vehicle guidance system according to the invention; and FIG. 2 shows a schematic flowchart of an exemplary embodiment of an object tracking method according to the invention.

FIG. 1 schematically shows an ego vehicle 1 which has an exemplary embodiment of an electronic vehicle guidance system 2 according to the invention. Furthermore, an object 5 to be tracked is illustrated in the environment of the ego vehicle 1. The object 5 to be tracked is in particular another vehicle which is schematically illustrated only as a rectangle.

The electronic vehicle guidance system 2 includes a computing unit 3 which can be embodied, for example, as a control unit, ECU, of the ego vehicle 1 or can be part of a control unit. The electronic vehicle guidance system 2 also has an environmental sensor system 4*a*, 4*b*, for example a camera 4*b* and/or a lidar system 4*a* and/or a radar system (not illustrated).

The vehicle guidance system 2 is capable of carrying out an object tracking method according to the invention. A corresponding flowchart of such a method is schematically illustrated in FIG. 2.

In step S1 of the method, for example, an initial state of the object 5 to be tracked is determined on the basis of a predefined movement model, for example, a single-track model. For this purpose, the computing unit 3 can use, for example, environmental sensor data from the environmental sensor system 4*a*, 4*b*. In step S2, a first state of the object 5 to be tracked is estimated or predicted on the basis of the predefined movement model by means of the computing unit 3, wherein the first state comprises a first direction of movement 6*a* of a point 8*a* to be tracked on the object 5 to be tracked. Furthermore, in step S2, the environmental sensor system 4*a*, 4*b* is used to generate environmental sensor data which represent the object 5 to be tracked.

In step S3, the computing unit 3 determines a geometric orientation of the object 5 to be tracked on the basis of the environmental sensor data. For this purpose, the computing unit 3 can apply, for example, an object recognition algorithm to a camera image from the camera 4*b* and/or can apply a cluster algorithm to a point cloud of the lidar system 4*a*. In this way, the computing unit 3 can determine a bounding figure which includes the object 5 to be tracked. In FIG. 1, a rectangle is illustrated as a bounding FIG. 7. The geometric orientation then corresponds to a predefined spatial orientation of the bounding FIG. 7; for example, the geometric orientation is parallel to one side of the bounding FIG. 7, in particular to the longer side of the rectangle.

The computing unit 3 also determines a current radius of movement of the object to be tracked, which corresponds to a radius of a circle 9, on the basis of the environmental sensor data. The point 8*a* to be tracked is then shifted by the computing unit 3 along the circle 9 by a circular arc section 10 of the length L=D*R, thus resulting in a shifted point 8*b*. In this case, R corresponds to the radius of the circle 9 and D corresponds to an angular difference between the first direction of movement 6*a* of the point 8*a* to be tracked and the geometric orientation of the object 5 to be tracked. The second direction of movement 6*b* of the shifted point 8*b* is then also approximately equal to the geometric orientation.

In step S4, the computing unit can calculate a correction factor on the basis of the shifted point 8*b* and in particular the second direction of movement 6*b*. For example, if an approach based on a Kalman filter is used, the correction factor may correspond to a corresponding Kalman gain factor.

In step S5, the state of the object 5 to be tracked is then updated depending on the correction factor, which in turn is determined depending on the shifted point 8*b*.

This makes it possible to achieve the situation in which the second direction of movement 6*b*, which is used to update the state of the object to be tracked, at least approximately corresponds to the geometric orientation of the object 5 to be tracked, thus enabling more accurate object tracking.

In various embodiments of the invention, the point to be tracked is shifted to a point which in particular has no transverse velocity, that is to say corresponds to a point which moves in the geometric orientation direction of the object to be tracked.

The object to be tracked is in particular a vehicle, for example an automobile with two axles. For example, if there is no wheel slip in the transverse direction, the shifted point may be on a non-steerable axle, i.e. an axle with non-steerable wheels, of the vehicle. For example, if there is wheel slip in the transverse direction, but the vehicle does not rotate around itself, and the vehicle has a steered and a non-steered axle, the shifted point may be between the two axles. In the general case, in which, in addition to the wheel slip in the transverse direction, there is also a rotation of the vehicle around itself and/or both axles are steerable axles, the shifted point may also be outside the vehicle.

In general, the shifted point can be determined by minimizing the deviation between the geometric orientation of the object to be tracked and the direction of movement on the basis of the movement model.

In some embodiments, an object filter, such as an extended Kalman filter, based on a corresponding state vector can be used. The state vector may include, for example, two-dimensional location coordinates of a point to be tracked, a translational velocity, a yaw rate, a yaw angle, and so on. The computing unit can determine the current radius of movement on the basis of the movement model or on the basis of the ratio of the translational velocity to the angular velocity of the object. The center of the corresponding circle can also be determined, with the connecting line between the circle center and the point to be tracked being perpendicular to the direction of movement of the point to be tracked. The point to be tracked can then be shifted on the circle by an angle corresponding to the angular difference between the geometric orientation and the direction of movement, in order to thus determine an optimally shifted point for tracking.

The invention claimed is:

1. An object tracking method, the method comprising:

estimating, by at least one computing unit, a first state of an object to be tracked based on a predefined movement model for the object to be tracked, wherein the first state comprises a first direction of movement of a point to be tracked;

generating, by an environmental sensor system, environmental sensor data which represent the object to be tracked;

determining, by the at least one computing unit, a geometric orientation of the object to be tracked based on the environmental sensor data;

shifting, by the at least one computing unit, the point to be tracked depending on a first deviation of the geometric orientation from the first direction of movement; and determining, by the at least one computing unit, a second state of the object to be tracked depending on the first state and the shifted point.

2. The method as claimed in claim 1, further comprising:

determining a current radius of movement of the point to be tracked based on the first state; and shifting the point to be tracked depending on the current radius of movement.

3. The method as claimed in claim 2, wherein the first state contains a translational velocity of the point to be tracked and an angular velocity of the point to be tracked; and the current radius of movement is determined as a ratio of the translational velocity to the angular velocity.

4. The method as claimed in claim 2, wherein the point to be tracked is shifted along a circular arc having a radius equal to the current radius of movement.

5. The method as claimed in claim 4, wherein the first deviation is determined as a first angular difference between the geometric orientation and the first direction of movement; and shifting the point is carried out by a circular arc section having a length L=D*R, where D denotes the first angular difference and R denotes the current radius of movement.

6. The method as claimed in claim 1, wherein the second state contains a second direction of movement of the shifted point, and a second deviation of the geometric orientation from the second direction of movement is smaller than the first deviation.

7. The method as claimed in claim 6, wherein the second direction of movement is equal to the geometric orientation.

8. The method as claimed in claim 1, further comprising:

generating a point cloud based on the environmental sensor data or providing the point cloud in the environmental sensor data;

identifying a part of the point cloud representing the object to be tracked; and determining a bounding figure, wherein the bounding figure comprises the part of the point cloud, and wherein the bounding figure has a predefined shape, wherein the geometric orientation of the object to be tracked corresponds to a spatial orientation of the bounding figure.

9. The method as claimed in claim 8, wherein the predefined shape of the bounding figure corresponds to a rectangle and the spatial orientation of the bounding figure is parallel to one side of the rectangle, or the predefined shape of the bounding figure corresponds to a cuboid and the spatial orientation of the bounding figure is parallel to an edge of the cuboid.

10. The method as claimed in claim 1, further comprising:

generating a camera image based on the environmental sensor data or providing the camera image in the environmental sensor data; and determining a bounding figure, wherein the bounding figure comprises a representation of the object to be tracked in the camera image, and wherein the bounding figure has a predefined shape, wherein the geometric orientation of the object to be tracked corresponds to a spatial orientation of the bounding figure.

11. The method as claimed in claim 1, wherein a method based on a Kalman filter is used to determine the second state.

12. A method for at least partially automatically guiding an ego vehicle, the method comprising:

carrying out, by the ego vehicle, the object tracking method as claimed in claim 1; and generating, by a control unit of the ego vehicle, at least one control signal for at least partially automatically guiding the ego vehicle, wherein generating the at least one control signal depends on the second state of the object to be tracked.

13. A non-transitory computer readable medium comprising computer program product containing machine readable instructions which, when executed by an electronic vehicle guidance system for an ego vehicle, cause the electronic vehicle guidance system to carry out the method as claimed in claim 1, wherein the electronic vehicle guidance system comprises:

the at least one computing unit; and the environmental sensor system.

14. An electronic vehicle guidance system for an ego vehicle, the electronic vehicle guidance system comprising:

at least one computing unit which is configured to estimate a first state of an object to be tracked based on a predefined movement model for the object to be tracked, wherein the first state comprises a first direction of movement of a point to be tracked; and an environmental sensor system which is configured to generate environmental sensor data representing the object to be tracked;

wherein the at least one computing unit is configured to carry out a method comprising:

determining a geometric orientation of the object to be tracked based on the environmental sensor data;

shifting the point to be tracked depending on a first deviation of the geometric orientation from the first direction of movement; and determining a second state of the object to be tracked depending on the first state and the shifted point.

15. The electronic vehicle guidance system as claimed in claim 14, wherein the environmental sensor system contains a camera and/or a lidar system and/or a radar system.

* * * * *